United States Patent [19]
Carter

[11] Patent Number: 5,929,335
[45] Date of Patent: Jul. 27, 1999

[54] SPEEDOMETER OR ODOMETER ASSEMBLY FOR IN-LINE SKATE

[76] Inventor: Robert L. Carter, 3124 Brossman Ct., Naperville, Ill. 60564

[21] Appl. No.: 08/869,091

[22] Filed: Jun. 4, 1997

[51] Int. Cl.$^6$ ........................................... G01P 1/02
[52] U.S. Cl. .................................................. 73/493
[58] Field of Search ............................. 73/493, 489, 490, 73/514.39; 324/207.22, 173–175, 207.25; 235/95 R, 96; 280/11.25, 11.19, 11.22, 11.23

[56] References Cited

U.S. PATENT DOCUMENTS

| | | | |
|---|---|---|---|
| 4,454,411 | 6/1984 | Hale et al. | 235/96 |
| 5,721,539 | 2/1998 | Goetzl | 235/95 R |

FOREIGN PATENT DOCUMENTS

| | | |
|---|---|---|
| 9209825 | 11/1992 | Germany . |
| 29612211 | 12/1996 | Germany . |

Primary Examiner—Robert Raevis
Attorney, Agent, or Firm—Dillis V. Allen, Esq.

[57] ABSTRACT

A speedometer or odometer assembly for an in-line skate that includes a signal processor and display housing mounted on the skate toe with a sensor mounted under the toe very close to the forward wheel. A field producing sensing element is fixed in the elastomeric portion of the forward wheel where it passes in close proximity to the sensor as the wheel rotates. The display housing is connected to the sensor by a flat conductor and the three are quickly removable as a unit from the skate.

8 Claims, 3 Drawing Sheets

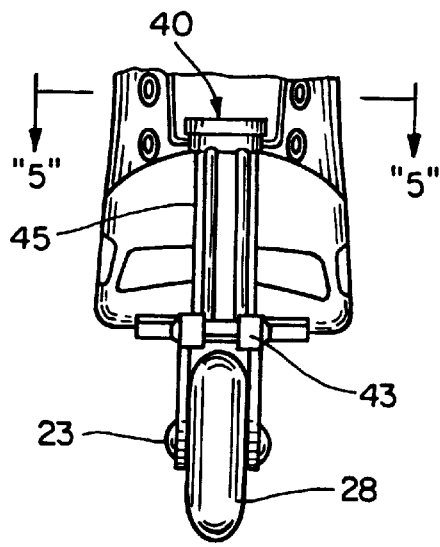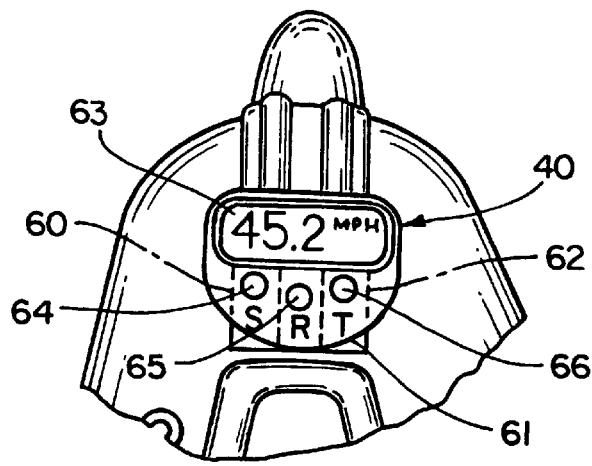
Fig. 4   Fig. 5
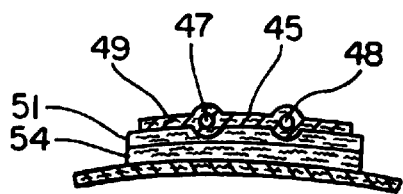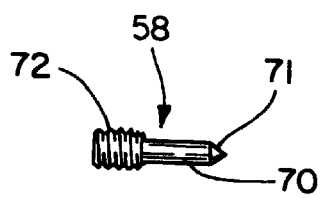
Fig. 6   Fig. 7
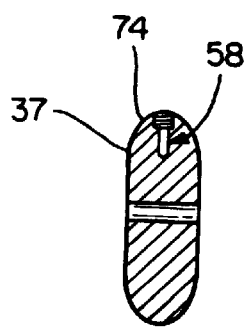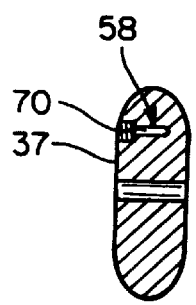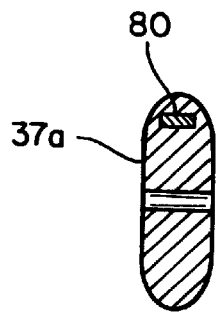
Fig. 8   Fig. 9   Fig. 10

SPEEDOMETER OR ODOMETER ASSEMBLY FOR IN-LINE SKATE

BACKGROUND OF THE PRESENT INVENTION

In-line skates of the type having a plurality of elastomeric wheel assemblies mounted in a common plane constitute one of the fastest growing product markets over the last ten years, particularly in this country but also in many other developed countries, principally because they are relatively easy for the inexperienced skater to maneuver, but even above that, the high speeds capable with in-line skates on a variety of surfaces, have made them the skate of choice for a variety of sports, such as hockey, and for newly developed specialized sporting activities, such as acrobatic skating.

In most sporting activities that are speed related, it is desirable to provide speedometer and odometer systems for the user to better appreciate his or her speed or distance achievements and improvements. However, somewhat surprising, and as a result of the search that was conducted in anticipation of this application, no such speedometer-odometer assembly has been provided that can be integrated directly into both after-market and OEM in-line skates, and it is to that objective that the present invention is pointed.

The patents found in this search include:

U.S. PATENTS

| Inventor | U.S. Pat. No. | Issue Date |
| --- | --- | --- |
| Smith | 2,505,154 | 4-25-50 |
| Moll | 3,505,878 | 4-14-70 |
| Hadtke | 3,978,725 | 9-7-76 |
| Jander, et al. | 4,262,537 | 4-21-81 |
| Price | 4,298,910 | 11-3-81 |
| Cameron | 4,546,650 | 10-15-85 |
| Tuyn, et al. | 4,860,585 | 8-29-89 |
| Dittbrenner | 5,003,820 | 4-2-91 |
| Irwin | 5,037,303 | 8-6-91 |
| Edwards | 5,344,055 | 9-6-94 |
| Pozzobon, et al. | 5,536,026 | 7-16-96 |
| Conway | 5,580,093 | 12-3-96 |

The Cameron, U.S. Pat. No. 4,546,650; the Tuyn, et al., U.S. Pat. No. 4,860,585; the Irwin, U.S. Pat. No. 5,037,303; the Moll, U.S. Pat. No. 3,505,878; the Hadtke, U.S. Pat. No. 3,978,725, and the Jander, et al., U.S. Pat. No. 4,262,537, all show speedometers for snow or water skis.

The Cameron patent is relevant in that it shows a speedometer mounted with Velcro to the ski and carries a snow-engaging wheel 17 that has magnets 19. A Hall effect sensor 20 is positioned so that it detects magnetic field changes induced by the passage of the magnets attached to the wheel. For example, in FIG. 5 the top magnet is oriented so that its North pole points out the right-hand face of the toothed wheel 17 while the bottom magnet is oriented so that its South pole points out the same side. Rotation of the wheel is detected by the Hall effect sensor 20 when the magnetic field changes back to its original polarity. This indication is then sent to the microcomputer 21 via the conductive leads(not shown) of the Hall effect sensor 20.

The Tuyn, et al., U.S. Pat. No. 4,860,585, shows a ski mounted device similar to Cameron's except for a downward spring biasing arrangement.

The Moll, U.S. Pat. No. 3,505,878; the Hadtke, U.S. Pat. No. 3,978,725; the Jander, et al., U.S. Pat. No. 4,262,537, and the Dittbrenner, U.S. Pat. No. 5,003,820, also relate to ski mounted speedometers but the technology is not useable in a built-in design for an inline skate.

The Smith, U.S. Pat. No. 2,505,154, shows a roller skate magneto mounted in the rear wheel of the skate that powers lights.

The Price, U.S. Pat. No. 4,298,910, shows a roller skate with wheel mounted generating devices for lights secured to the wheels or other parts of the skate.

The Pozzobon, et al., U.S. Pat. No. 5,536,026, shows a wheel mounted generator for roller skates to provide a power source for computer-generated systems for developing data relating to average speed, distance and time used to cover the distance in sporting activities.

FIG. 10 discloses a plurality of first magnets 212 within the wheel assembly, a second set of magnets 215 outside the wheel frame, and a plurality of windings 210 on the inside of the frame facing magnets 212. The inventor says little about this embodiment, but it appears to me to be an electricity generating system as opposed to a speed sensor.

The Conway, U.S. Pat. No. 5,580,093, shows a generator similar to Price's.

And finally, the Edwards, U.S. Pat. No. 5,344,055, shows a water bottle holding device for in-line roller blades, which is not of any specific significance.

It is a primary object to ameliorate the problems noted above in speedometer assemblies adapted for other uses and to provide an extremely well-designed speedometer assembly for uncomplicated attachment to either after-market or OEM in-line skates.

SUMMARY OF THE PRESENT INVENTION

In accordance with the present invention, a speedometer-odometer assembly is provided for an in-line skate that includes a signal processor-display housing mounted on top of the toe of the skate and a sensor assembly mounted under the skate toe in close proximity to both the forward wheel and the processor-display housing.

This optimum location on the skate provides a plurality of application and manufacturing benefits. The position of the sensor under the toe portion of the skate accommodates the widest variety of skate designs. Wheel frame design, that is the downwardly directed frame from the shoe that supports the in-line wheels, varies significantly from one skate model to another so while in one design wheels other than forward wheels may have significant portions of wheel surfaces exposed that could be utilized as the sensing wheel, in another design that wheel may be completely covered except for a small ground engaging portion. Thus, the selection of the forward wheel as the sensing wheel enables the present speedometer-odometer to be incorporated into a wide variety of basic skate designs.

Next, the location of the processor display housing on top of the toe and the location of the sensor under the toe provides a compact unit connected by only a short flat conductor cable that runs over the toe. The short conductor cable, while reducing product cost, makes the unit more durable and more easily removed from the skate for hockey play or acrobatic skating.

Toward this end the display housing, the flat conductor and the sensor are Velcroed to the skate toe for easy removal as a unit.

An important aspect of the present invention is the mounting of the sensoring element within the elastomeric portion of one of the skate wheels. Typically, the tread portion of in-line skate wheels is a solid polyurethane elastomer in the Shore A durometer range of 80 to 100. The field producing sensing elements, according to one embodiment of the invention, have threaded shank portions that permit the magnets to be threaded into holes in the elastomer, either as cast or drilled. This is an extremely secure and durable mounting arrangement for the magnetic sensing elements. And also because these elastomers are typically compression molded, the magnet elements can, according to another embodiment, be insert molded into the elastomer.

Another feature of the present invention is an adjusting mechanism that enables the sensor to be moved radially toward the sensing wheel as the wheel wears. This is particularly useful in designs that mount the magnet into the outer surface of the wheel.

Another important aspect of the present invention is that the velcro carrier for the present speedometer assembly constitutes a safety device and that upon side impact the Velcro will release the assembly minimizing damage to the speedometer assembly and reducing the possibility of user injury.

A further advantage in the configuration of this speedometer assembly that includes a flexible flat conductor interconnecting the odometer-speedometer housing and remote sensor enables the assembly to conform to a wide variety of toe shapes.

Other objects and advantages will appear more clearly from the following detailed description.

BRIEF DESCRIPTION OF THE DRAWINGS

FIG. 4 is a front view of the speedometer-odometer assembly on the in-line skate illustrated in FIG. 3;

FIG. 5 is an enlarged top view of the in-line skate illustrated in FIGS. 1 to 4, partly fragmented;

FIG. 6 is a fragmentary cross-section through the flexible flat conductor taken generally along line 6—6 of FIG. 3;

FIG. 7 is an implantable magnet assembly utilized in the elastomeric wheels in FIGS. 8 and 9;

FIG. 10 is a cross-section of an elastomeric wheel similar to FIGS. 8 and 9 with an insert molded magnetic element;

DETAILED DESCRIPTION OF THE PREFERRED EMBODIMENTS

Figure 1:
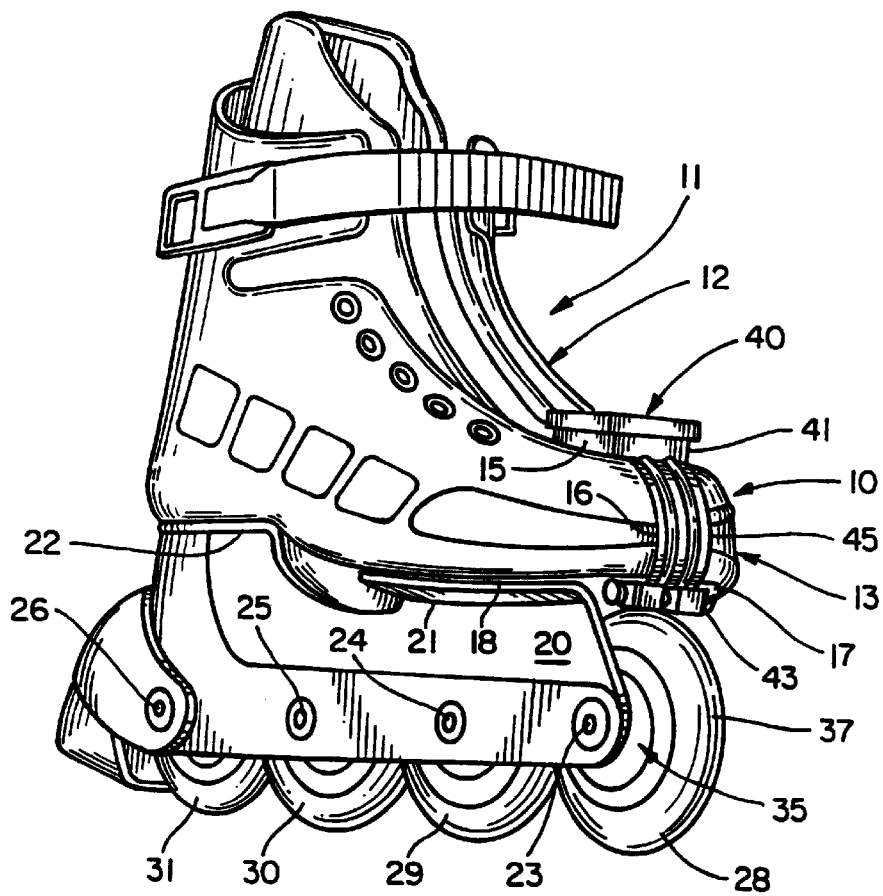
FIG. 1 is a perspective view of a conventional in-line roller skate with the present speedometer-odometer assembly in situ.
Figure 2:
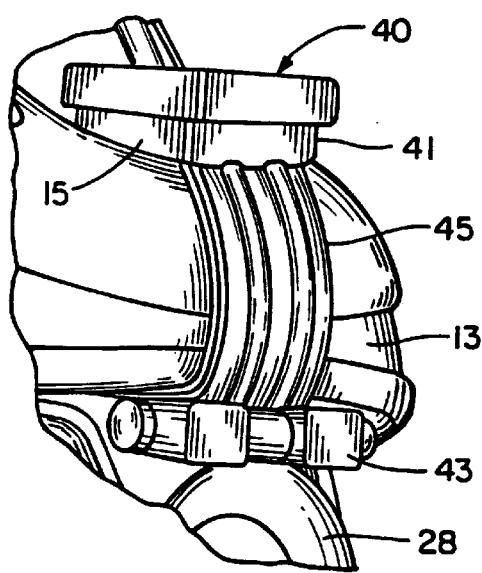
FIG. 2 is an enlarged perspective of the speedometer-odometer assembly illustrated in FIG. 1.
Figure 3:
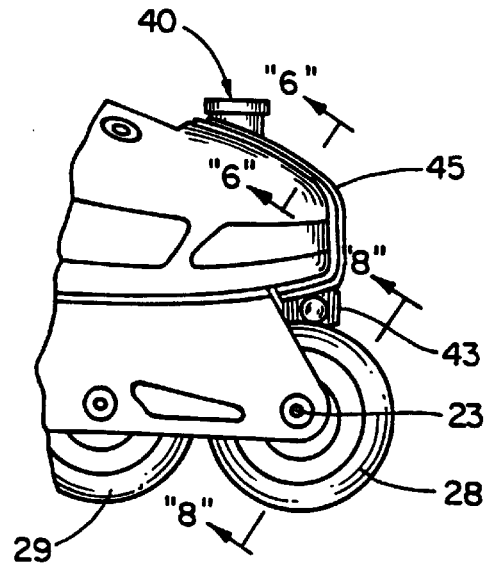
FIG. 3 is a side view of the speedometer-odometer assembly illustrated in FIGS. 1 and 2 in place on an in-line skate.

Referring to the drawings and particularly FIGS. 1 to 5, a speedometer-odometer assembly 10 is illustrated attached to and wrapped around a toe portion of a conventional in-line skate assembly 11 that includes an upper shoe portion 12 having a toe portion 13 with an upper generally downwardly and forwardly sloped surface 15, a generally vertically downwardly directed arcuate portion 16, and a generally flat rigid lower surface 17. The shoe carries a downwardly depending wheel frame 20 that has flanges 21 and 22 carried by the rigid lower surface 18 of shoe portion 12.

Frame 20 has a plurality of removable fastening elements 23, 24, 25 and 26, that provide bosses for the wheel assemblies 28, 29, 30 and 31. Each of the wheel assemblies includes a roller bearing assembly 35 and a solid elastomeric tread portion 37.

The elastomeric tread portion 37 is typically a thermoplastic polyurethane having a Shore A durometer in the range of 80 to 100.

The speedometer-odometer assembly 10 is designed to be optimally located in a position where it can be easily read by the user, is easily removable, is safety oriented, and is adapted to sense a magnetic element in the forward one of the wheels 28, 29, 30 and 31, and namely, forward wheel 28. The magnetic elements sensed by the assembly are illustrated in FIGS. 7 to 10. The design of the speedometer-odometer assembly 10 and its capability of sensing forward wheel rotation, gives the assembly the ability to accommodate the widest variety of in-line skate and frame configurations.

Toward these ends, the speedometer-odometer assembly 10 includes a signal processor-display housing 40 slidably mounted in a bracket 41, and electrically connected to a sensor assembly 43 by a flat flexible conductor 45. The conductor 45 can be seen in cross-section in FIG. 6 and includes conductors 47 and 48 encased in a flat elastomeric ribbon 49 that easily wraps around and conforms to the configuration of the skate toe surfaces 15, 16 and 17, and particularly to accommodate varying configurations of these surfaces from one skate model to another.

A Velcro strap, Part A, designated by the reference numeral 51 in FIG. 6, is fixed to the underside of the bracket 41 and the underside of the conductor ribbon 49. The end of the conductor ribbon 49 is fixed to one side of the sensor 43. A second similarly shaped Velcro strap 54, Part B, is fixed to shoe upper surface 15, shoe forward surface 16, and shoe lower toe surface 17, and in this way the signal processor-display housing 40, the conductor ribbon 49, the sensor 43, and Velcro strap portion 51, can be removed from the skate as a unit, and particularly from shoe mounted Velcro strap 54. This enables the speedometer-odometer assembly to be removed for calibration, repair, and most frequently for activities that may damage the speedometer assembly such as hockey.

The sensor 43 has a sensing rod contained therein that operates with a Hall effect with magnetic elements illustrated in FIGS. 7, 8 and 9, to produce a pulse as a result of the magnetic field generated by a magnet as it passes the sensor 43. This arrangement produces a pulse for each revolution of the wheel 28 that is transmitted by conductor 45 to a signal processing circuit 60 in the signal processor display 40. The processed signals are stored in a storage area 61 which is sensed by a display driving circuit 62, which in turn drives an upwardly directed LCD display 63.

The storage circuit 61 includes calibration circuitry suitable for accommodating different diameter wheels and also for changing the assembly function from velocity to accumulated distance. Calibration can also be selected in either metric or English as will appear to those skilled in the art. Switches 64, 65 and 66 accommodate these various functions and provide user input to the contained on-board circuitry which includes an on-board battery.

As seen in FIG. 7, the present magnetic element 58 includes an annular shank portion 70 with a pointed end 71 and an enlarged threaded portion 72 at its other end. Shank portion 70 is the magnetic element and produces the magnetic field to be sensed by Hall effect sensor 43.

An important aspect of the present invention is seen in FIGS. 8 to 10, where the magnetic element is embedded directed into the solid elastomeric tire portion 37 in the forward wheel 28. Because the elastomeric wheel portion 37 is fairly rigid, in the Shore A 80 to 100 range, it is machineable so that holes can be drilled in its tread surface or side surface to receive and hold a magnetic element 58. At the same time, its somewhat resilient characteristics provide some shock resistance for the magnetic element 58 that reduces the possibility of the magnetic element 58 working its way out of the wheel tread 37.

As seen in FIGS. 8 and 9, a magnetic element can be drilled and threaded into the outer peripheral tire portion 74 in a radially inwardly directed fashion as seen in FIG. 8, or can be threaded into an axial bore in the side of the tread portion 37 as seen in FIG. 8. Both the alternatives shown in FIGS. 8 and 9 can be utilized in either the OEM or the after-market.

In the FIG. 8 mounting design, another magnet may be used having one or more barbs at its radially inner end. This type of fastening element would be undamaged by tread wear, whereas the screw threads 72 may experience some wear.

A further alternative is shown in FIG. 10, where a magnetic plug 80 is illustrated that is insert molded when the wheel tread portion is cast directly into the tread portion 37a. The insert molding technique can be utilized in both the OEM and the after-market, but in the after-market the speedometer-odometer assembly 10 would require a new forward wheel 28 carrying the embedded magnetic plug 80.

Figure 11:
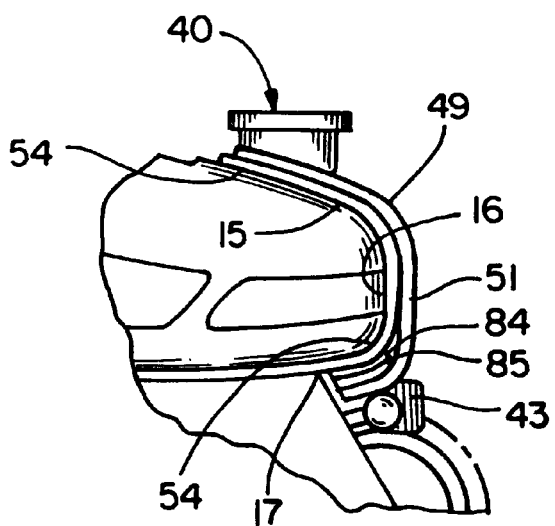
FIG. 11 is a fragmentary section of the in-line skate toe portion showing an adjustment feature for the sensor to compensate for wheel wear.

An important aspect of the present invention and as seen in FIG. 11, is the provision of means for adjusting the position of the sensor radially inwardly toward the axis of the forward wheel 28 as the tread portion 37 of the wheel wears. This is accomplished in the FIG. 11 embodiment by two additional Velcro strips 84 and 85 releasably attached to the Velcro strips 51 and 54 directly above the sensor 43. Strips 84 and 85 can be a part of the kit in which the speedometer assembly 10 is sold, and additional strips can be provided if necessary to accommodate further wear, or they can be thinner to accommodate lesser wear. This adjustment assures, depending upon the position of the magnetic element in the wheel tread 37, that the sensor will pick up the field produced by the magnetic element, particularly in the FIG. 8 embodiment where the magnetic element may move inwardly as the tire tread wears.

Figure 12:
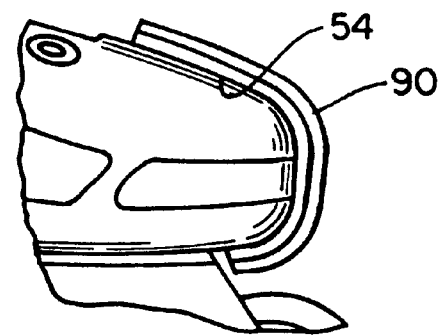
FIG. 12 is a fragmentary side view with the speedometer-odometer assembly removed with a protective strap in its place.

In FIG. 12, the speedometer-odometer assembly is removed from the lower Velcro strap 54, which is replaced by a protective Velcro cover strap 90 that keeps the strap 54 free of foreign matter.

I claim:

1. A speedometer or odometer assembly for an in-line roller skate of the type having a shoe frame having a toe portion including an upper surface and a lower surface supported on a downwardly projecting wheel frame rotatably supporting a plurality of wheels in a generally common plane including a forward wheel having a tread portion adjacent the toe portion lower surface, comprising: a speedometer or odometer assembly mounted on the toe portion upper surface including a signal processor adapted to process signals representing skate speed, display driving circuitry responsive to the signal processor and a digital display facing generally upwardly so it can be read by the skater, a sensor mounted on the toe portion lower surface directly adjacent the forward wheel, connected by short conductor means to the signal processor, and a discrete sensing element carried by the forward wheel tread portion in a position to pass in close proximity to the sensor as the forward wheel rotates.

2. A speedometer or odometer assembly for an inline roller skate as defined in claim 1, wherein the sensing element is embedded in the forward wheel.

3. A speedometer or odometer assembly for an inline roller skate as defined in claim 1, including means for connecting the speedometer assembly, the conductor means and the sensor together as a unit, and quick release means permitting the removal of the unit rapidly from the skate.

4. A speedometer or odometer assembly for an inline roller skate as defined in claim 3, wherein the quick release means includes part A and part B Velcro with one of the parts fixed to the skate toe portion.

5. A speedometer or odometer assembly for an inline roller skate of the type having a shoe frame having a toe portion including an upper surface and a lower surface supported on a downwardly projecting wheel frame rotatably supporting a plurality of wheels in a generally common plane including a forward wheel adjacent the toe portion lower surface, comprising: a speedometer or odometer assembly mounted on the toe portion upper surface including a signal processor adapted to process signals representing skate speed, display driving circuitry responsive to the signal processor and a digital display facing generally upwardly so it can be read by the skater, a Sensor mounted on one of the frames in close proximity to one of the skate wheels, electronically connected to the signal processor, and a discrete sensory element carried by one of the wheels in close proximity to the sensor as the one wheel rotates past the sensor, said sensing element being carried in a radially outward position on the one wheel, said sensor being mounted on said one frame radially outward from the one wheel, and means to adjust the position of the sensor radially inwardly with respect to the one wheel as the wheel wears to maintain sensing effectiveness.

6. A speedometer or odometer assembly for an inline roller skate as defined in claim 5, wherein the sensing element is embedded in the one wheel.

7. A speedometer or odometer assembly for an inline roller skate as defined in claim 5, wherein the sensor is mounted on the toe portion lower surface and the sensing element is carried in a radially outward position on the forward wheel.

8. A speedometer or odometer assembly for an in-line roller skate of the type having a shoe frame having a toe portion including an upper surface and a lower surface supported on a downwardly projecting wheel frame rotatably supporting a plurality of wheels in a generally common plane including a forward wheel adjacent the toe portion lower surface, comprising: a speedometer or odometer signal receiving assembly mounted on the toe portion upper surface including a signal processor adapted to process signals representing skate speed for a digital display, a sensor mounted on the toe portion lower surface directly adjacent the forward wheel, connected by short conductor means to the signal processor, and a discrete sensing element carried by the forward wheel in a position to pass in close proximity to the sensor as the forward wheel rotates.

* * * * *